Oct. 24, 1950     A. R. DEL CAMPO     2,526,642
ELECTRET-TYPE GENERATOR AND MOTOR
Filed June 30, 1949
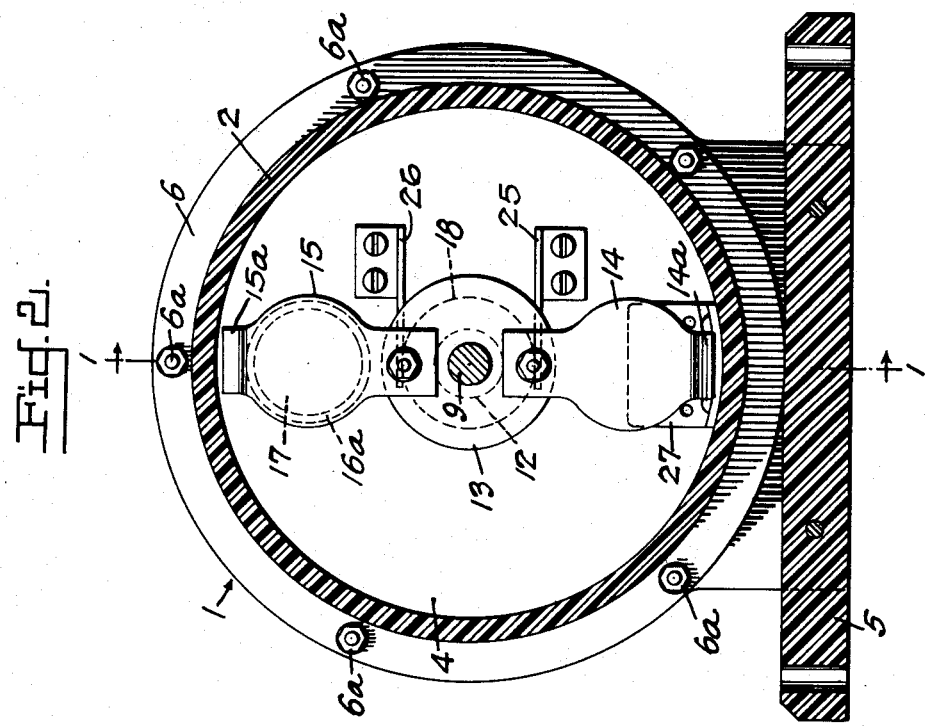
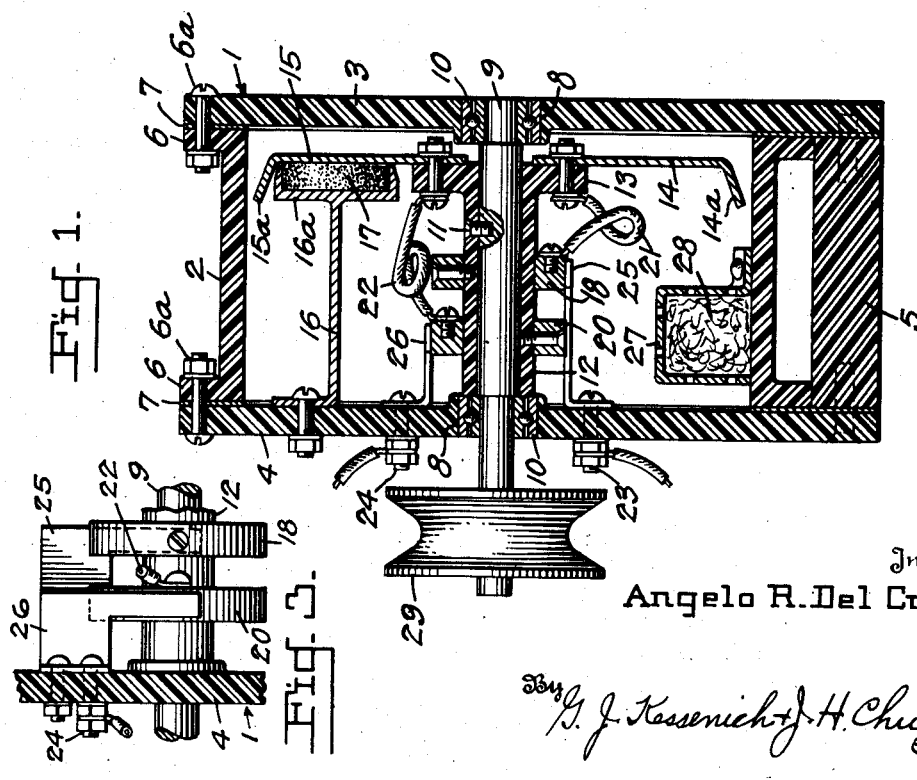
Inventor
Angelo R. Del Campo
By G. J. Kessenich & J. H. Church
Attorneys Patented Oct. 24, 1950

2,526,642

UNITED STATES PATENT OFFICE 2,526,642

ELECTRET-TYPE GENERATOR AND MOTOR

Angelo R. Del Campo, Chicago, Ill.

Application June 30, 1949, Serial No. 102,188

3 Claims. (Cl. 171—329)

(Granted under the act of March 3, 1883, as amended April 30, 1928; 370 O. G. 757)

The invention described in the specification and claims may be manufactured and used by or for the Government for governmental purposes without the payment to me of any royalty thereon.

This invention relates to improvements in electrical generators and more particularly to a generator utilizing an electret. The usual small generator is composed of relatively large amounts of low and high carbon steel and copper resulting in a device of considerable weight and bulk. In contrast to the foregoing my high voltage generator is a light weight unit employing but a minimum of metallic parts.

One object of this invention is to produce a light weight high potential electrical generator utilizing an electret.

Another object of this invention is to produce a high voltage generator having low rotational inertia.

A practical embodiment of the invention is illustrated in the accompanying drawings wherein:

Figure 1 is a sectional view of the electret type of generator taken along line 1—1 of Figure 2.

Figure 2 is an end view of the generator partly in section and showing the vanes.

Figure 3 is a fragmentary view showing the collector rings and brushes.

Referring now to the drawings by characters of reference there is shown in Figure 1 an embodiment of my invention wherein 1 generally indicates the plastic housing composed of a plastic cylindrical body 2 having a flange 6 at each end, and end plates 3—4 supported by a base member 5. The end plates 3 and 4 and cylindrical body are fastened together as indicated at 6a or in any suitable manner. Disposed in the joint formed by the flanges 6 and end plates is a gasket 7 for moisture proofing. If desired the joint formed by the cylindrical body and end plates may be heat sealed. Each end plate is centrally apertured as at 8 to accommodate bearings 10 and shaft 9. Affixed to shaft 9 by set screw 11 is an insulating plastic sleeve 12 having a flange 13. Diametrically disposed thin metallic vanes 14—15 are fastened to flange 13. The vanes 14 and 15 have inwardly turned ends 14a and 15a respectively. A metallic arm 16 fastened to the end plate 4 supports a metal container 16a having a disk shaped electret 17 therein leaving one surface of the disk exposed to the metal vanes. If desired any number of vanes and electrets may be used. Mounted on the sleeve 12 opposite its flanged end are two collector rings 18 and 20. Collector ring 18 is connected to vane 14 by means of conductor 21, and collector ring 20 is connected to vane 15 by conductor 22. Rings 18 and 20 being connected to output terminals 23 and 24 by means of brushes 25 and 26 respectively. Mounted within the plastic housing is a perforated container 27 containing a desiccant 28 since it is desirable to keep the electret dry. Mounted on one end of shaft 9 is a pulley or other device 29 for rotating the shaft.

For the purpose of illustrating my device, assume the vanes being rotated and the surface charge on the electret's surface facing the vanes being negative and that there is a load applied across terminals 23 and 24. The instant the center of vane 15 is directly opposite the electret's center, vane 15 will be at maximum positive charge, the negative surface of the electret having repelled electrons from vane 15 through the load between terminals 24 and 23 and thence to vane 14, leaving vane 14 with a temporary excess of negative charge. When vane 15 moves away from the negative surface of electret 17, electrons start flowing back to vane 15 through the load from vane 14. This process continuing until the vanes have gone through half a cycle. Then as the cycle continues, electrons start flowing off vane 15 as it goes through the second half of the cycle. The cycle is completed when vane 15 returns to the position facing the negative surface of the electret. Thus there has been generated an alternating current.

If it is desired to obtain more power from the generator shown in the drawings it only becomes necessary to position an electret opposite vane 14 in a manner similar to electret 17, but with positive face of the electret facing the vane. Another option would be to use, instead of this second electret, a metallic disk, similarly mounted, but connected to ground. The device can be extended to a polyphase alternating current generator by increasing the number of pairs of vanes and having a pair of collecting rings and brushes for each pair of vanes. If a commutator is substituted for the rings my device becomes a direct current generator. Obviously if a potential is applied to the terminals 23 and 24 then my device can be used as a motor.

To keep the electret at maximum strength it is necessary that it be provided with a keeper. This is accomplished in my device by using one of the vanes to contact the exposed surface of the electret and extend completely across it and contact the opposite walls of the container 16a. The vane may be positioned manually to cover the electret by aligning reference marks on the shaft and one of the end plates. The inwardly turned ends of the vanes place the center of gravity of the vanes to the left of the plane of rotation. Upon rotation of the vanes the center of gravity tends to move to the right in order to get into the plane of rotation and thereby, creating a slight gap between the vanes and the surface of the electret.

I claim:

1. In an electrical generator the combination of a revolving shaft, an insulating sleeve affixed to said shaft and having a flange at one end thereof, diametrically opposed vanes affixed to said flange and insulated from each other, an electret in cooperating relationship with said vanes, said vanes having their free ends turned inwardly toward said electret, one of said vanes completely contacting the exposed surface of said electret when said shaft is turning at a very slow speed or is stationary and being moved into non-contacting plane of rotation at higher speeds.

2. In an electrical generator, the combination of a revolving shaft, an insulating sleeve affixed to said shaft and having a flange at one end thereof, diametrically opposed substantially rectangularly shaped vanes each having one end affixed to said flange and insulated from each other, collector rings mounted on said sleeve intermediate its ends, conductors connecting said rings to said vanes, brushes connecting said rings to output terminals; an electret having one surface facing said vanes in cooperating relationship, the opposite end of each vane being turned inwardly toward the electret placing the center of gravity of each vane to one side of the plane of rotation, the vanes spacing themselves from the electret upon rotation of said shaft.

3. In an electret generator, the combination of a housing comprising a cylindrical plastic body having flanged ends, plastic end plates fixed to said body in airtight relationship, said end plates being centrally apertured, a revolving shaft mounted in said apertures, an insulating sleeve mounted on said shaft and supporting diametrically opposed vanes, collector rings mounted on said sleeve connecting said vanes to output terminals in one of said end plates, an electret mounted in a metal cup within said housing and having its exposed surface completely contacted by one of said vanes when the vanes are not rotating, the center of gravity of each vane positioned to space each vane from said surface upon rotation of said shaft and cut the electrostatic lines of force of said electret.

ANGELO R. DEL CAMPO.

REFERENCES CITED

The following references are of record in the file of this patent:

UNITED STATES PATENTS

| Number | Name | Date |
|---|---|---|
| 779,190 | Thomson | Jan. 3, 1905 |

FOREIGN PATENTS

| Number | Country | Date |
|---|---|---|
| 2,442 | Great Britain | Of 1912 |